United States Patent Office 2,714,083
Patented July 26, 1955

2,714,083
APPETITE SATIENT
Edgar A. Ferguson, Jr., Brooklyn, N. Y.
No Drawing. Application August 7, 1951,
Serial No. 240,788
4 Claims. (Cl. 167—55)

This invention relates to a new and improved therapeutic agent and is more particularly concerned with the production of a novel therapeutic appetite satient composition designed, upon oral administration, to curb the appetite, craving, or desire for fattening foods of higher calories, resulting in lessened food intake and eventually in reduction of weight.

Appetite satients have been known for many years but have not, until quite recently, become recognized as true medicinal agents. There are a number of elements involved in the process of satisfying or curbing the appetite. It is well known, of course, that the sight of some unpleasant material will cause the individual to lose his appetite. It is also well known that drinking water in large quantities causes a temporary loss of appetite due to a dilution of gastric juices and other causes. One of the most well known methods, and one which is widely practiced at the present time, is the eating of sweets before a meal. Evidently, the eating of sweets causing a suppression of secretions, and perhaps the rise in blood sugar as it is absorbed in the system, causes the appetite to be lost.

A method employed by physicians for many years has been the administration of atropine orally which causes drying of the throat. This dry feeling causes loss of appetite, but since it is coupled with suppression of gastric flow it is difficult to determine just what mechanism is involved in this therapy.

It has now been found, in accordance with the present invention, that there may be provided a composition of matter including a combination of specific materials, employed in specific proportions, which is highly effective to produce a markedly enhanced curbing of the appetite as compared with the drugs, sweets, and bulk agents known to the prior art.

More specifically, the novel appetite satient composition of the present invention contains, as its active ingredient, a particular mixture of sodium carboxymethylcellulose (hereinafter referred to as CMC) and tartaric acid. It has been found that CMC causes satiety by its action on the mucuous membrane of the mouth while the composition is being dissolved therein. This neutral and physiologically inert colloid substance, it has been discovered, has the property of so combining with the fluids secreted in the oral cavity that a mild taste-insulating coating is placed over the whole of the mucuous membrane. This viscous coating covers the taste buds for a period of time and destroys the keenness of taste and the appreciation of food. It has been further found that the addition of tartaric acid to CMC, in a certain specific proportion, will greatly enhance this action.

Each of the foregoing materials, which in specific admixture form the active ingredient of the composition of the present invention, has some efficacy in and of itself as an appetite satient. However, tests with each of the ingredients taken singly show that, although their individual satient effect is evident, it is not nearly as pronounced as when the two materials are employed one with the other in certain specific proportions. In combination, the two ingredients have a far superior appetite satient effect than would be expected from the additive satient qualities of the individual materials. Stated differently, the two materials exhibit taste synergism in the indicated environment. It may be demonstrated that small amounts of CMC will cause some satiety in the presence of tartaric acid. When tartaric acid is not employed the effect of the CMC is negligible. Small amounts of tartaric acid, which provide a dry taste, will likewise cause some degree of satiety, but when CMC is not present the effect of tartaric acid is negligible.

The ratio of these two active ingredients, CMC and tartaric acid, as employed in the final composition, is highly critical. About one part of tartaric acid to four parts of CMC is necessary. A proportion or ratio which decreases the proportionate amount of tartaric acid, for instance one part of tartaric acid to six parts of CMC, is too little to provide practical and optimum appetite satiency, whereas an increase in the proportionate amount of tartaric acid, such as one part of tartaric acid to three parts of CMC, will cause too great an acidity and thus destroy the taste insulating property of the CMC.

The CMC— tartaric acid mixture, in the specific proportions above indicated, is incorporated into a physiologically harmless edible vehicle to produce the final composition. The vehicle is made up of conventional flavoring, coloring and excipient materials. In the final composition, which is preferably in tablet form, the active mixture of CMC and tartaric acid must comprise at least one-third of the final tablet composition. Lower concentrations have been found ineffective.

The following specific example is given as illustrative of the composition of the present invention as applied to a single tablet or wafer although it will be understood that the vehicle ingredients may be modified:

| Active ingredients: | Milligrams |
|---|---|
| Sodium carboxymethylcellulose | 400 |
| Tartaric acid | 100 |
| Vehicle: | |
| Flavor: | |
| Sugar | 10 |
| Citric acid | 20 |
| Saccharine | 10 |
| Flavoring (lemon oil or artificial grape flavor) | 1.4 |
| Color: | |
| Amaranth red | 2 |
| Methylene blue | 1 |
| Excipient: | |
| Dextrose | 791 |

As stated, various changes in the vehicle components will be apparent to those skilled in the art of tablet making. For instance, chalk, magnesium trisilicate, beta lactose, sorbitol and mannitol, or mixtures thereof may be substituted for the dextrose excipient in the foregoing formula. Likewise, other flavoring materials, or mixtures thereof, may be employed such as phosphoric acid, lactic acid, orange oil (bitter, N.F.,-sweet, U. S. P.), lime oil, wild cherry extract, cocoa, coumarin, vanillin, and sodium cyclamate (sugar substitute). Moreover, any certified Food, Drug and Cosmetic Act Aniline Food Dyes may be used, such as Amaranth Red, Methylene Blue, F D & C Blue #1 (Brilliant Blue), F D & C Green #1 (Guinea Green B), F D & C Orange #2 (Orange SS), F D & C Red #1 (Ponceau 3R), F D & C Yellow #2 (Napthol Yellow S–K Salt), and any plant extract dye (vegetable dye) suitable for food use.

The following vehicle formulations are further illustrative of the invention, 400 mg. of sodium carboxymethylcellulose and 100 mg. of tartaric acid being employed with each vehicle formulation:

A candy wafer (stamped form):　　　　　Milligrams
 Sugar (powdered) _____ 400
 Sodium stearate _____ 80
 Corn syrup _____ 20
 Flavor and color added.

A candy wafer (heat mold):
 Dextrose _____ 200
 Sugar _____ 100
 Corn syrup _____ 100
 Flavor and color added.

A jelled confection:
 Dextrose _____ 50
 Lactose _____ 150
 Sugar _____ 100
 Corn syrup _____ 100
 Sodium alginate _____ 50
 Flavor and color added.

A non-nutritive candy:
 Sorbitol _____ 200
 Mannitol _____ 200
 Plasticizer (gum arabic) _____ 10
 Flavor and color added.

Two of the tablets or wafers are taken fifteen to thirty minutes before meal time to realize optimum satient effect. It will be understood, of course, that the tablets are not to be chewed but are to be slowly dissolved in the mouth so that the insulating coating of viscous CMC containing dissolved tartaric acid will be allowed to form on the mucuous membrane.

I claim:

1. An appetite satient composition adapted to be dissolved slowly in the saliva of the mouth, whereby the inner mouth surfaces, including the tongue, are lined with a mild, taste-insulating coating which temporarily covers the taste buds and destroys keenness of taste and appreciation of food, said composition being in substantially solid form and containing, as its active ingredient, a mixture of about four parts of sodium carboxymethylcellulose and one part of tartaric acid.

2. An appetite satient composition adapted to be dissolved slowly in the saliva of the mouth, whereby the inner mouth surfaces, including the tongue, are lined with a mild, taste-insulating coating which temporarily covers the taste buds and destroys keenness of taste and appreciation of food, said composition being in substantially solid form and comprising an edible vehicle containing, as an active ingredient, a mixture of about four parts of sodium carboxymethylcellulose and one part of tartaric acid.

3. An appetite satient composition adapted to be dissolved slowly in the saliva of the mouth, whereby the inner mouth surfaces, including the tongue, are lined with a mild, taste-insulating coating which temporarily covers the taste buds and destroys keenness of taste and appreciation of food, said composition being in substantially solid form and comprising an edible vehicle containing, as an active ingredient, a mixture of about four parts of sodium carboxymethylcellulose and one part of tartaric acid, said active ingredient comprising at least one-third of the composition.

4. An appetite satient tablet adapted to be dissolved slowly in the saliva of the mouth, whereby the inner mouth surfaces, including the tongue, are lined with a mild, taste-insulating coating which temporarily covers the taste buds and destroys keenness of taste and appreciation of food, said tablet comprising a mixture of the following ingredients employed in the approximate amounts indicated:

Milligrams
Sodium carboxymethylcellulose_____ 400
Tartaric acid _____ 100
Sugar _____ 10
Citric acid _____ 20
Saccharine _____ 10
Flavoring (artificial grape flavor)_____ 1.4
Amaranth red_____ 2
Methylene blue_____ 1
Dextrose _____ 791

References Cited in the file of this patent
UNITED STATES PATENTS
2,302,511  Wallach _____ Nov. 1, 1942
2,393,561  Perech _____ Jan. 22, 1946

OTHER REFERENCES

Hollabaugh, Industrial and Engineering Chemistry, vol. 37, October 1945, p. 945.

U. S. Dispensatory, 23rd ed. (1943), p. 55.

Blythe, Jour. of the Amer. Pharm. Assn., vol. 38, Sci. Ed., February 1949, pp. 59 to 64.

Amer. Jour. of Pharmacy, December 1949, p. 493.

U. S. Dispensatory, 24th ed. (1947), pp. 1190, 1191.

Modern Drugs, April 1951, p. 603.